United States Patent [19]

Jones

[11] Patent Number: 5,079,466

[45] Date of Patent: Jan. 7, 1992

[54] METHOD OF MOUNTING MOTOR LAMINATION STACKS

[75] Inventor: Donald W. Jones, Burnt Hills, N.Y.

[73] Assignee: General Electric Company, Schenectady, N.Y.

[21] Appl. No.: 542,345

[22] Filed: Jun. 22, 1990

[51] Int. Cl.$^5$ ............................................. H02K 5/00
[52] U.S. Cl. ........................................ 310/91; 310/42; 310/43; 310/71; 310/218; 310/254; 310/261
[58] Field of Search ....................... 310/91, 51, 216, 71, 310/217, 44, 218, 89, 42, 43, 179, 180, 254, 258, 261, 268, 67 R, 195

[56] References Cited

U.S. PATENT DOCUMENTS

| | | | |
|---|---|---|---|
| 4,145,626 | 3/1979 | Aroshidze | 310/91 |
| 4,169,990 | 10/1979 | Lerdman | 318/138 |
| 4,617,484 | 10/1986 | Buijsen | 310/51 |
| 4,672,250 | 6/1987 | Seitz | 310/67 R |
| 4,760,299 | 7/1988 | Dickie | 310/43 |
| 4,867,581 | 9/1989 | Schmidt | 310/67 R |
| 4,914,330 | 4/1990 | Pierrat | 310/82 |
| 4,943,748 | 7/1990 | Shiozawa | 310/67 R |

Primary Examiner—R. Skudy
Attorney, Agent, or Firm—Marvin Snyder; James C. Davis, Jr.

[57] ABSTRACT

A method and apparatus for supporting a high torque, low speed electric motor suitable for mass production includes a pair of drawn steel annular frames each having an L-shaped cross section. One frame is coupled to the stator and another is coupled to the rotor. In order to provide torque pulsation isolation, at least one of the frames is coupled to its respective rotor or stator by an elastomeric bonding material that is held in compression such that radial motion is minimized while permitting limited torsional motion. One of the frames, preferably the stator support frame, may be press-fit or coupled to the stator via a hard-setting polymer or a low melting point metal such as zinc. The L-shaped frames each have a flange extending radially and which is adapted for connection to a motor frame or to a driven element.

5 Claims, 3 Drawing Sheets

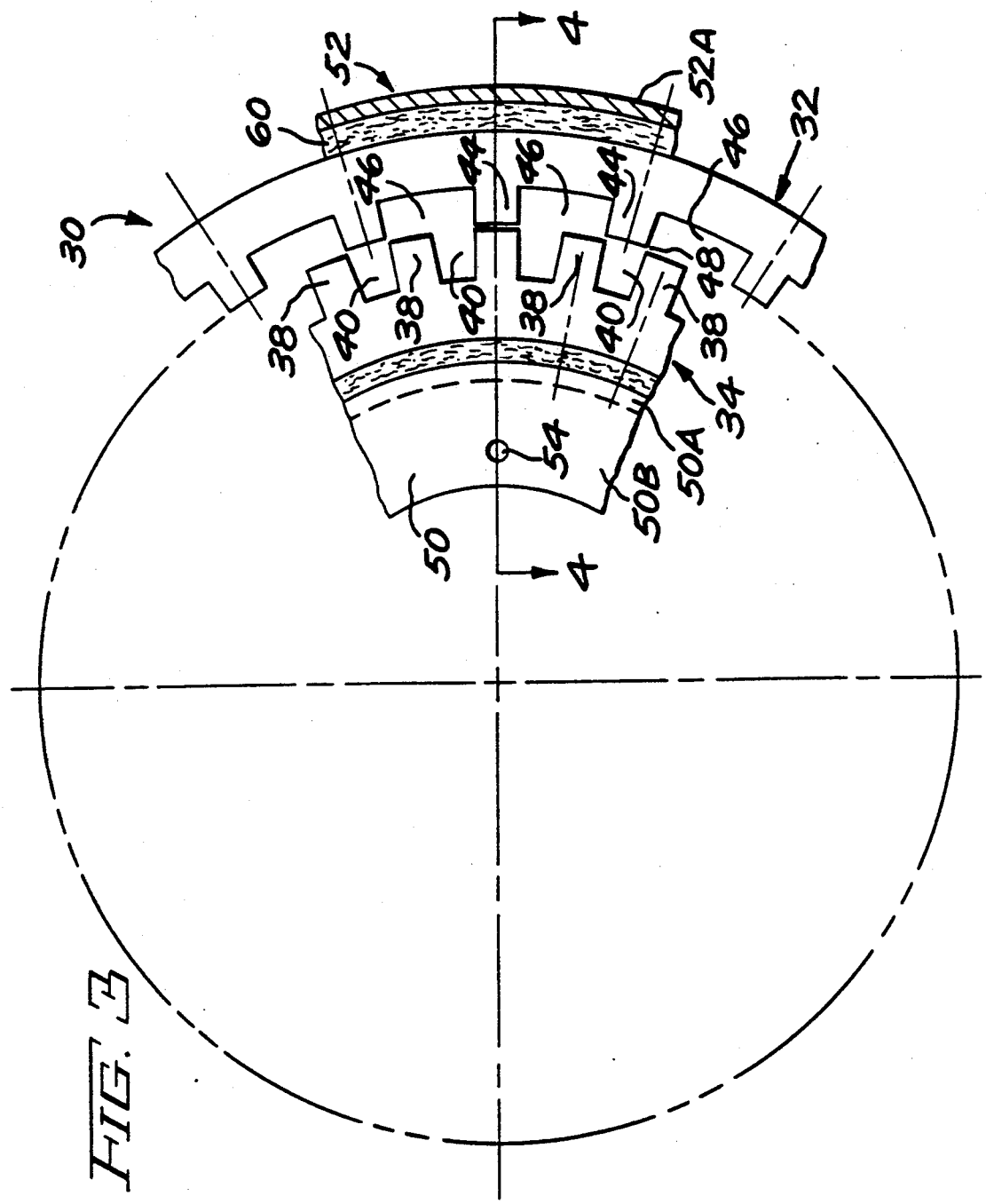

METHOD OF MOUNTING MOTOR LAMINATION STACKS

The present invention relates to dynamoelectric machines and, more particularly, to a method and apparatus for supporting motor laminations in high torque, low speed, electric motors.

BACKGROUND OF THE INVENTION

Improvements in magnetic materials and commutation techniques have enabled dynamoelectric machines to be significantly reduced in size while developing as much or more power than their larger, bulky predecessors. In some instances, the size reductions have resulted in machine structures having less than desirable rigidity. For example, some high torque, low speed motors are constructed with many poles at a large radius and have limited stiffness in the radial direction. Some of these motors may have an air gap diameter of about eight inches and a lamination stack height of about one and one-half inches. In order to maintain uniform circularity of the lamination stack so as to maintain a uniform air gap between stator and rotor, it is necessary to support the stator and rotor in a rigid frame. However, it is desirable to minimize the mass of frame structure necessary to provide such support.

In switched reluctance (SR) motors or in single phase motors, rigidity is particularly important since such motors generate torque pulsations which produce noise unless the magnetic structure is mechanically isolated from the base structure by a torsionally soft mount. Accordingly, it is desirable to provide a mounting structure for such dynamoelectric machines of relatively low mass, suitable for low cost mass production and which provides isolation of radial and torsional vibrations from the base structure.

SUMMARY OF THE INVENTION

It is an object of the present invention to provide a method and apparatus for structurally supporting a rotor and stator in a dynamoelectric machine rigidly and precisely in a manner suitable for low-cost mass production.

It is another object of the present invention to provide a method and apparatus for structurally supporting a rotor and stator in a dynamoelectric machine rigidly and precisely, with vibration isolation between a base structure and the rotor and stator.

In an illustrative embodiment, the invention is incorporated in a dynamoelectric machine comprising an armature having an annular core and a plurality of winding stages arranged to establish a predetermined number of magnetic poles. The core has a thickness in a radial direction which is relatively small with respect to the diameter of the core such that the core is relatively flexible in the radial direction. A rotor is adapted to rotate relative to the armature in response to the magnetic poles established on the armature. The winding stages are connected to a source of electric power which energizes them in a predetermined manner to establish the magnetic poles on the armature for causing rotation of the rotor. An annular support member has one flange extending generally radially and another flange extending generally axially. The core is connected by a first connecting means to the axially extending flange such that the support member provides radial stiffness to the core during operation of the motor. In addition, the machine includes a second annular support member which has one radially extending flange, and an axially extending flange connected to the rotor by a second connecting means, such that the second support member provides radial stiffness to the rotor during operation of the machine. One of the connecting means is comprised of an elastomeric material held in compression between a respective axially extending flange and the adjacent core and rotor. Another of the connecting means comprises a polymeric material between one of the axially extending flanges and an associated one of the core and rotor. Alternatively, a relatively low melting point metal may be substituted for the polymeric material.

BRIEF DESCRIPTION OF THE DRAWINGS

For a better understanding of the present invention, reference may be had to the following detailed description taken in conjunction with the accompanying drawings in which:

FIG. 3 is a simplified, partial cross-sectional view, taken through the motor axis, of the rotor and stator configuration in an SR motor having an outer rotor and inner stator, embodying the principles of the present invention.

DESCRIPTION OF THE PREFERRED EMBODIMENT

Figure 1:
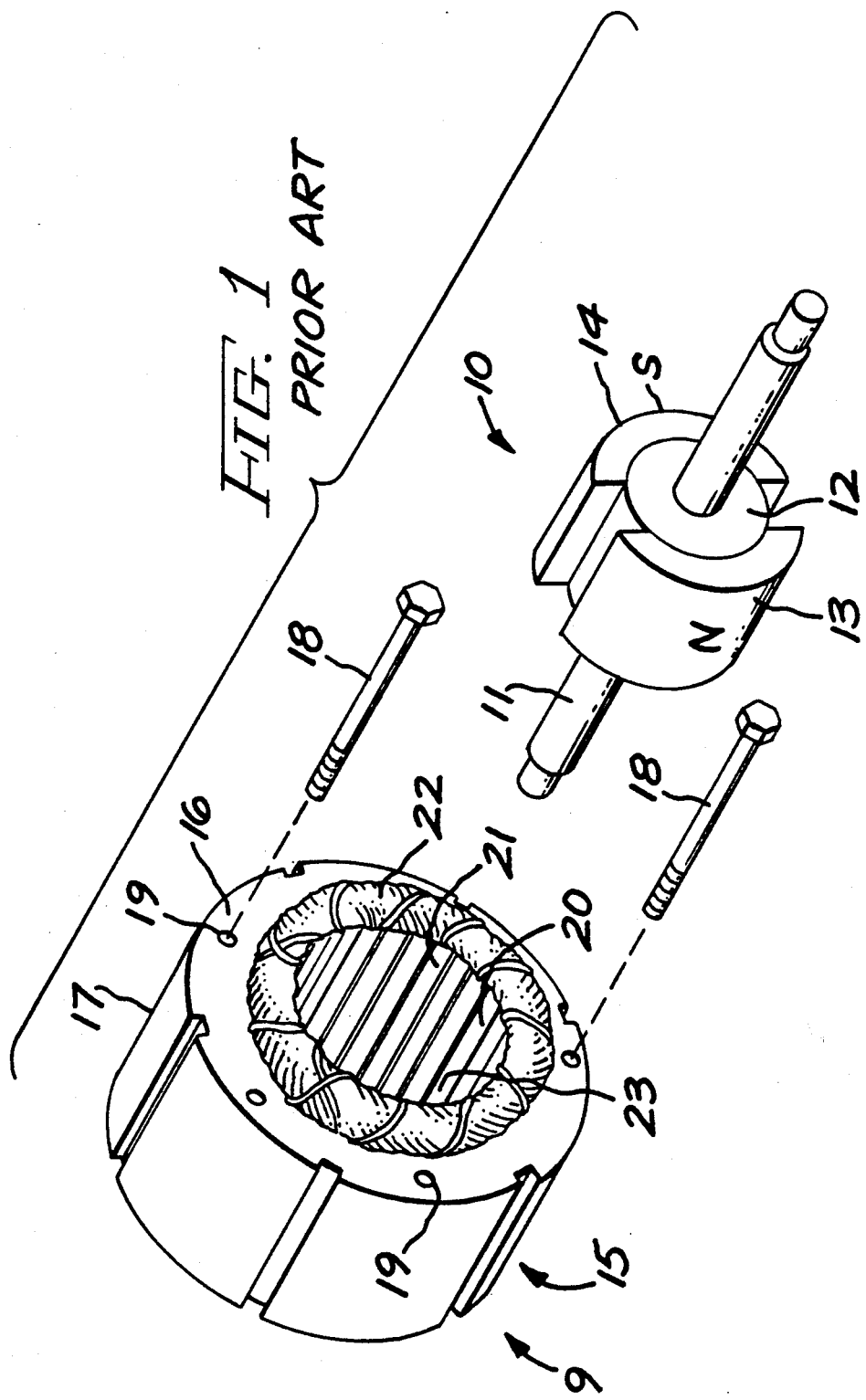
FIG. 1 is a simplified, exploded, perspective view of an illustrative electrodynamic machine.

Before turning to a description of the present invention, reference is first made to FIG. 1 for an illustrative example of a dynamoelectric machine, shown as an electronically commutated motor (ECM) 9, which may be constructed with a large diameter and short axial length, and is provided for the purpose of setting forth the general components and structure of a dynamoelectric machine.

Motor 9 is provided with two winding stages, two poles, and a permanent magnet rotor 10 mounted on a shaft 11 which is rotatably supported by conventional bearing means (not shown) within a desired housing (not shown). Rotor 10 is magnetized across its diameter in a manner known to the art. In the illustrated embodiment, rotor 10 comprises a solid magnetic core 12 of metal and a pair of typically steel, arcuate permanent magnets 13 and 14 disposed on the periphery of the core in diametrically opposed relationship.

The stator or stationary armature assembly 15 includes a relatively low reluctance magnetic member 16 which is formed of a plurality of like armature laminations 17 assembled in juxtaposed relationship. The laminations may be held together by a plurality of armature through-bolts 18, only two of which are fragmentarily shown, that pass through coaxially positioned through-bolt holes 19 in the stator laminations. Alternatively, the core laminations may be welded, keyed, adhesively bonded together, or merely held together by the windings, all as will be understood by persons skilled in the art. Each lamination includes a plurality of teeth 20 along its interior bore such that the assembled laminations provide a plurality of axially extending slots 21 within which the armature windings 22 are disposed.

The stationary armature assembly has an axial bore 23 within which is received rotor 10. The arcuate magnets 13 and 14 are mounted (e.g., by an adhesive such as an epoxy resin) on the outer surfaces of the low reluctance core 12 (which may be laminated but does not need to be) to establish constant magnetic polarity regions with North-South polarizations. Magnetization is in the radial direction, with radial thickness selected to produce the desired magnetomotive force (for a given magnet material) or to assure that no irreversible demagnetization occurs from the fields produced by the current in the armature windings during stalled conditions.

Motor 9 is of a typical construction in which structural support is provided by a solid metal core 12 for the rotor and by a relatively thick set of laminations 17 forming the stator. As the diameter of such motors is increased, it becomes desirable to reduce the mass of metal in both rotor 10 and stator 15. Some applications have used a "spider" construction in place of solid metal core 12. The laminations of the stator are often physically connected to the outer motor housing (not shown) to provide stator support. This latter connection is typically a solid connection necessitating external shock mounting of the motor housing to a base structure in order to prevent transmission of noise generated by torque pulsations. In some applications, motor 9 may be built "inside-out", i.e., with the stator on the inside and the rotor on the outside. In this latter form, the difficulty of supporting the stator laminations is exacerbated.

Figure 2:
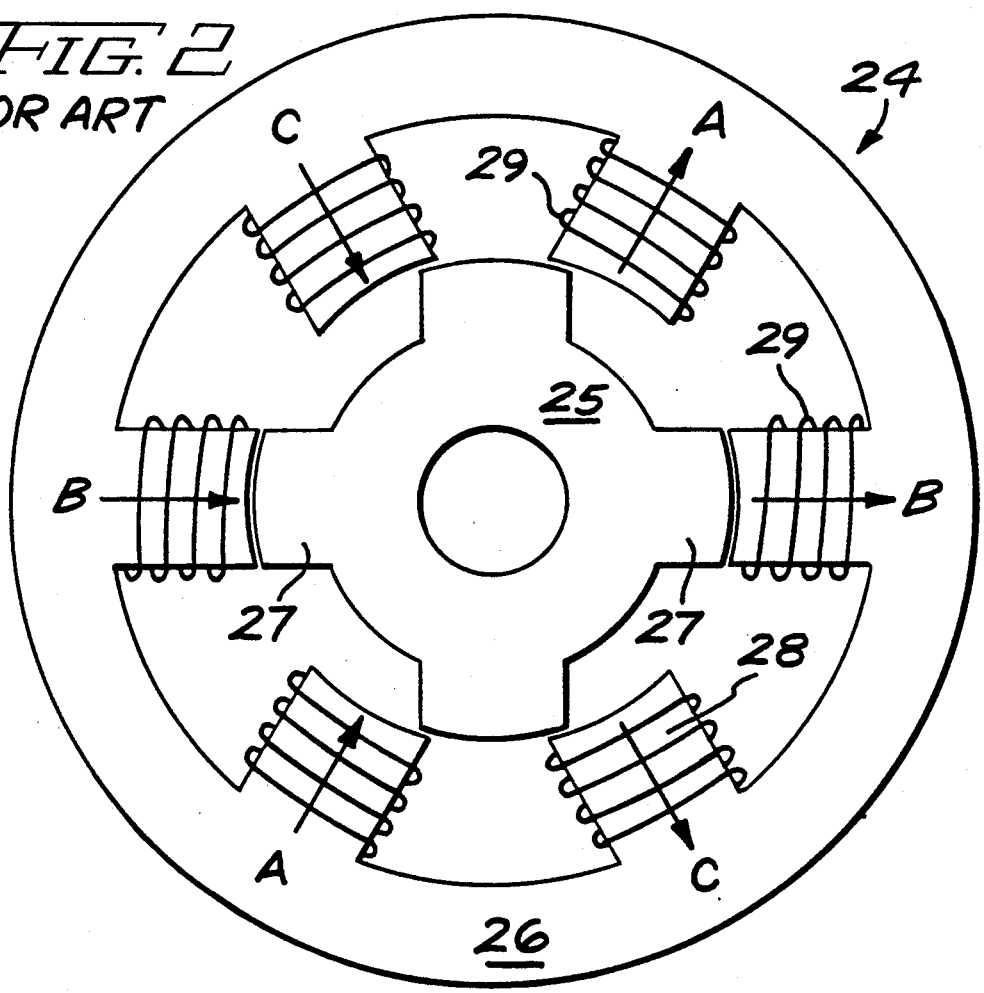
FIG. 2 is a simplified, cross-sectional view, taken through the motor axis, of the rotor and stator configuration in a high torque, low speed SR motor.

FIG. 2 is a cross-sectional, axial, schematic representation of a switched reluctance (SR) motor 24. A major difference between motor 9 of FIG. 1 and SR motor 24 of FIG. 2 is the absence of permanent magnets 13, 14 on the SR motor rotor 25 and the different number of poles on rotor 25 and stator 26 of the SR motor. The magnetic geometry of SR motor 24 includes rotor 25 with four salient pole projections 27 and stator 26 with six salient pole projections 28. However, it will be appreciated that other numbers of projections or salient poles could be implemented. Rotor 25 does not include permanent magnets or electrical windings for establishing magnetic poles. Stator 26 includes an electrical coil winding 29 associated with each respective one of pole projections 28. Coil windings 29 of diametrically opposite stator pole projections 28 are connected in electrical series to form a phase. When a phase is electrically excited, magnetic flux is produced in the diametrically opposite pole projections in a manner that assists in pulling the nearest ones of pole projections 27 on rotor 25 into alignment with the electrically excited ones of stator pole projections 28, thereby causing rotor 25 to rotate. When a pair of rotor pole projections are pulsed substantially into alignment with an electrically excited pair of stator pole projections, an electronic circuit (not shown) removes electrical excitation from the aligned pair of pole projections and transfers excitation to an adjacent pair of pole projections forming another stator phase. Another pair of rotor pole projections will then be pulled into alignment with the last excited stator phase pole projections, causing the rotor to again rotate. Sequential switching of stator phase excitation thereafter causes continuous rotation of rotor 25.

FIG. 3 is a simplified cross-sectional view, taken axially, of an SR motor 30 of the type having an outer rotor 32 and an inner stator 34. The armature or stator 34 comprises a plurality of stacked laminations 36 (see FIG. 4) which are aligned so as to form a plurality of circumferentially spaced pole projections or teeth 38 defining a plurality of axially extending slots 40 within which armature windings (not shown) may be disposed. The outer rotating rotor 32 may comprise a plurality of stacked laminations 42 (see FIG. 4) also aligned to form a plurality of circumferentially spaced pole projections or teeth 44 defining a plurality of axially extending slots 46. Alternatively, in an ECM configuration, the outer rotor may comprise a plurality of circumferentially spaced permanent magnets, such as shown in FIG. 1, attached to a relatively thin support or embedded in a case structure in a manner well known in the art.

A high torque, low speed motor of the form shown in FIG. 3 may have a diameter at air gap 48, i.e., at the diameter of stator 34, of about eight inches while the axial length of the motor, i.e., the lamination stack height, may be only one and one-half inches. The magnetic attraction between the rotor pole pieces or teeth 44 and the stator pole pieces or teeth 38 may be sufficient to distort the generally circular shape of the stator and rotor and result in physical contact between the respective pole pieces. Such contact can damage the motor and result in premature failure.

Figure 4:
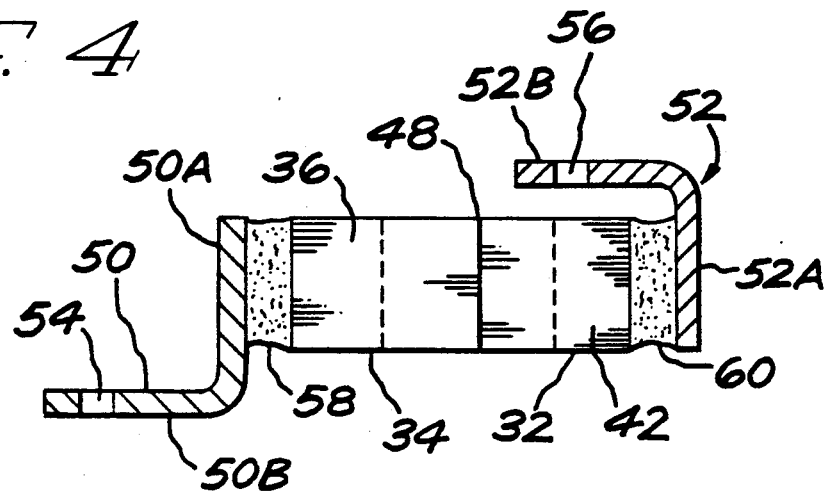
FIG. 4 is a cross-sectional view taken along line 4—4 in FIG. 3.

The present invention provides a method and apparatus for supporting the radially soft stator and rotor of FIG. 3 using an L-shaped support member 50 coupled to stator 34 and an L-shaped support member 52 coupled to rotor 32. FIG. 4 is a cross-sectional view taken along line 4—4 in FIG. 3 and more clearly shows the L-shaped configuration of support members 50, 52. Each support member 50, 52 has a respective first flange 50A, 52A, which extends in an axial direction and is coupled to a corresponding radially inner and radially outer surface of a respective one of the stator 34 and rotor 32. Each support member 50, 52 also includes a respective second radially extending flange 50B, 52B which provides radial stiffness to the support members. Support members 50, 52 are each annular members typically formed of drawn steel to provide sufficient structural rigidity with relatively low mass. Each of flanges 50B, 52B is provided with a plurality of circumferentially-spaced mounting holes indicated at 54 and 56. In the inside-out arrangement illustrated, flange 50B may be bolted to a motor frame or housing while flange 52B may be bolted to an apparatus to be driven. One application for the illustrated motor is for use in a washing machine drive wherein flange 52B is bolted to a washing tub support for directly driving the tub in both a laundering (agitating) and spin drying mode. Alternatively, flange 50B may be bolted to an intermediate support or web rather than to a motor housing.

As mentioned above, SR motors, as well as single-phase motors, are subject to torque pulsations which are noise producing. It is therefore desirable to mount such motors in a manner which provides isolation of radial and torsional vibrations from a base structure. In the motor shown in FIGS. 3 and 4, isolation is provided by employing an elastomeric material to form at least one coupling between one of flanges 50A, 52B and the respective stator and rotor. An elastomeric material of the type to be employed herein is one that can be held in compression so as to produce virtually zero motion in the radial (compression) direction while remaining relatively soft in the circumferential shear direction, such as, for example, natural rubber, neoprene, or nitrile rubber. Lack of motion in the radial direction is critical to maintaining a relatively narrow air gap 48. While both the coupling joints 58 and 60 may be comprised of an elastomeric material, one of the joints, particularly joint 58, can be relatively rigid and achieved by use of a press fit or by injection molding of a polymer or a low melting point metal such as aluminum or zinc. Aluminum and zinc injection techniques are well known in the art for bonding metal to metal.

While the invention has been described in the context of an inside-out motor, it is equally applicable to conventional motor structures. Furthermore, while the L-shaped support member is illustrative of a simple shape with good radial support and ease of assembly, other shapes could be substituted. For example, support members 50, 52 could be formed with a double flange 50B, 52B giving them the appearance of a Z-shape or a C-shape and providing additional stiffness in the radial direction. It is intended, therefore, that the invention not be limited to the specific illustrative embodiment but be interpreted within the full spirit and scope of the appended claims.

What is claimed is:

1. A dynamoelectric machine comprising an armature having an annular core and a plurality of winding stages arranged to establish a predetermined number of magnetic poles, the core having a thickness in a radial direction which is relatively small with respect to the diameter of the core such that the core is relatively flexible in the radial direction, a rotor having constant magnetic polarity regions equal in number to the predetermined number of magnetic poles, said rotor being adapted to rotate relative to the armature in response to magnetic flux produced by the magnetic poles established on the armature, said winding stages being electrically energizable in a predetermined manner to establish the magnetic poles on the armature for causing rotation of the rotor, a first annular support member having at least a first flange extending generally axially and a second flange extending generally radially, and first connecting means including a relatively low melting point metal and coupling said core to said first flange in a manner such that said first annular support member provides radial stiffness to said core during operation of the machine.

2. The dynamoelectric machine of claim 1 including a second annular support member having at least a first flange extending generally axially and a second flange extending generally radially, and second connecting means coupling the first flange of said second annular support member to said rotor in a manner such that said second annular support member provides radial stiffness to said rotor during operation of the machine.

3. The dynamoelectric machine of claim 2 wherein at least one of said first and second connecting means comprises an elastomeric material held in compression between a respective one of said first flanges and the adjacent one of said core and said rotor.

4. The dynamoelectric machine of claim 2 wherein one of said first and second connecting means comprises a polymeric material.

5. The dynamoelectric machine of claim 2 wherein one of said first and second connecting means comprises a relatively low melting point metal.

* * * * *